United States Patent
Röper et al.

[11] Patent Number: 6,099,602
[45] Date of Patent: Aug. 8, 2000

[54] FUEL OR LUBRICANT COMPOSITIONS CONTAINING SECONDARY POLYISOBUTENE AMINES

[75] Inventors: Michael Röper, Wachenheim; Bernhard Geissler; Ernst Langguth, both of Kirchheim; Heinz-Josef Kneuper, Mannheim, all of Germany

[73] Assignee: BASF Aktiengesellschaft, Ludwigshafen, Germany

[21] Appl. No.: 09/077,585

[22] PCT Filed: Dec. 16, 1996

[86] PCT No.: PCT/EP96/05635

§ 371 Date: Jun. 2, 1998

§ 102(e) Date: Jun. 2, 1998

[87] PCT Pub. No.: WO97/23586

PCT Pub. Date: Jul. 3, 1997

[30] Foreign Application Priority Data

Dec. 21, 1995 [DE] Germany ............ 195 48 145

[51] Int. Cl.$^7$ ...................................... C10L 1/22
[52] U.S. Cl. ............... 44/412; 508/545; 525/333.8; 525/374; 525/379
[58] Field of Search ............... 508/545; 44/412; 525/379, 374, 333.8

[56] References Cited

U.S. PATENT DOCUMENTS

| | | | |
|---|---|---|---|
| 3,574,576 | 4/1971 | Honnen | 44/432 |
| 3,801,642 | 4/1974 | Worrel | 564/402 |
| 4,526,936 | 7/1985 | Jachimowicz et al. | 525/379 |
| 5,103,061 | 4/1992 | Blackborow et al. | 564/472 |
| 5,508,356 | 4/1996 | Dever et al. | 525/379 |
| 5,567,211 | 10/1996 | Russo et al. | 44/412 |
| 5,583,186 | 12/1996 | Duncan | 525/368 |

FOREIGN PATENT DOCUMENTS

| | | |
|---|---|---|
| 244 616 | 11/1987 | European Pat. Off. |
| 457 386 | 11/1991 | European Pat. Off. |
| 541 176 | 5/1993 | European Pat. Off. |
| 578 323 | 1/1994 | European Pat. Off. |
| 2 016 126 | 5/1970 | France |
| 36 11 230 | 10/1987 | Germany |
| 195 25 938 | 1/1997 | Germany |
| 1 254 338 | 11/1971 | United Kingdom |
| 95/24431 | 9/1995 | WIPO |

*Primary Examiner*—Jacqueline V. Howard
*Assistant Examiner*—Cephia D. Toomer
*Attorney, Agent, or Firm*—Keil & Weinkauf

[57] ABSTRACT

A fuel or lubricant composition containing polyisobutene amines and which contains at least one secondary polyisobutene amine of the formula I,

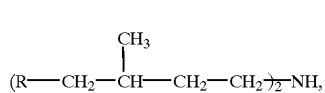

(I)

in which R denotes a polyisobutene radical containing from 6 to 45 isobutylene units, up to 20% of the isobutylene units being replaceable by n-butylene units, provided that the amount of the secondary polyisobutene amine is larger than the amount of any corresponding primary or tertiary polyisobutene amine which may also be present.

10 Claims, No Drawings

FUEL OR LUBRICANT COMPOSITIONS CONTAINING SECONDARY POLYISOBUTENE AMINES

This application is a 371 of PCT/EP96/05635.

The invention relates to polyisobutene amines containing fuel or lubricant compositions having a percentage of secondary polyisobutene amines, the amount of the secondary polyisobutene amine being in excess over corresponding primary or tertiary polybutene amines which may be present, a process for the preparation of polyisobutene amine mixtures containing predominantly secondary polyisobutene amines, and also these novel mixtures and the use thereof as fuel or lubicant additives.

EP 0,244,616 reveals the use of polyisobutene amines of the formula

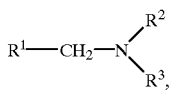

in which $R^1$ denotes a polyisobutene radical and $R^2$ and $R^3$ denote, inter alia, hydrogen, as additives for fuels and lubricants. In the synthesis process described in said reference polyisobutene is hydroformylated in a first stage to produce a polyisobutene aldehyde or a polyisobutene alcohol $R^1$—CH=O or $R^1$—CH$_2$OH using cobalt or rhodium catalysts at temperatures between 80° and 200° C. and CO/H$_2$ pressures of up to 600 bar.

In a second stage the hydrogenative amination to a polyisobutene amine product, which predominantly consists of the primary amine $R^1$—CH$_2$—NH$_2$ and, in lesser quantities, of the secondary amine

and tertiary amine

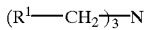

takes place in the presence of ammonia using a suitable catalyst at elevated temperature and pressure.

Fuel or lubricant compositions containing this polyisobutene amine product as additive are distinguished by greatly improved application properties, particularly by a detergent action inducive to cleaning of the fine channels of the carburettor, and also the avoidance of deposits on the valves. This guarantees better combustion of the fuel and lower pollutant emmision.

Although the said polyisobutene amine product exhibits excellent application properties, it has been found, surprisingly, that a further improvement of the detergent effect is possible if the fuel and lubricant additives used comprise a polyisobutene amine mixture that contains predominantly secondary polyisobutene amines.

Accordingly, the present invention relates to a fuel or lubricant composition that contains effective amounts of at least one secondary polybutene amine of the formula Ia

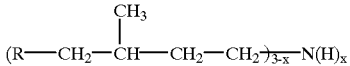

in which R denotes a polyisobutene radical containing from 6 to 45 preferably from 8 to 35, isobutylene units, where up to 20% of the isobutylene units can be replaced by n-butylene units and x stands for the number 1, as represented by the formula I:

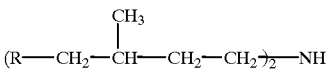

provided that the amount of the secondary polyisobutene amine is larger than the amount of any primary polyisobutene amine of the formula Ia (x=2) or tertiary polyisobutene amine of the formula Ia (x=0) which may also be present.

The content of the secondary polyisobutene amine is preferably at,least 50 wt %, based on the total content of primary, secondary, and tertiary polyisobutene amines.

In another preferred embodiment, those secondary polyisobutene amines of the formula Ia are used in which the polyisobutene radical exhibits a molecular weight which is less than that of the usual primary polyisobutene amines and accordingly n denotes only the numbers 6 to 20.

Since in the case of the aforementioned prior two-stage method of hydroformylation with subsequent amination the secondary polyisobutene amine is formed in only very small quantities, the invention also relates to a novel process for the preparation of polyisobutene amine mixtures containing predominantly secondary polyisobutene amines of the formula Ia (x=1).

We have now found that mixtures of primary, secondary and tertiary polyisobutene amines containing predominantly, eg 60 wt % of, secondary polyisobutene amines of the formula Ia (x=1) are obtained when the hydroformylation and amination are carried out simultaneously, ie when polyisobutene of the formula II

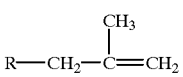

in which R has the meanings defined above and n stands for the numbers 6 to 45, is hydroformylated with CO/H$_2$ in the presence of at least equivalent amounts, preferably an excess of, in particular, from 1 to 100 equivalents of, ammonia under the action of a rhodium catalyst capable of forming rhodium carbonyl complexes under the reaction conditions, at temperatures ranging from 80° to 200° C. and pressures of up to 600 bar and is aminated during the same step.

At least the partial use of aqueous ammonia is particularly advantageous in this case, since, as a result, no undesirable precipitation of carbaminate is to be observed.

An unsupported rhodium catalyst is usually employed. A particularly suitable catalyst is rhodium acetate, rodium nitrate, rhodium dicarbonyl acetylacetonate, or triphenylphosphine rhodium carbonyl hydrogen or a mixture of said rhodium compounds with phosphines or phosphites.

Although EP 0,457,386 Example 5 reveals that predominantly secondary amines are formed in single-stage hydroformylation and amination, this is only described for 1-octene as starting material and ruthenium as catalyst.

Furthermore EP 0,578,323 only mentions the use of ammonia for simultaneous hydroformylation and amination in the summary, however, whereas the specification and examples describe the reaction of polyisobutene with only specific primary amines, with which necessarily secondary polyisobutene amines of a different structure are formed.

The mixtures of polyisobutene amines (primary, secondary, and tertiary) of the formula Ia obtained in the present invention are thus novel and also comprise subject matter of this invention in the form of a novel mixture of substances, as also the use thereof as fuel additive.

These mixtures usually have a composition of from 0.5 to 30 wt % of primary, from 50 to 99 wt % of secondary, and from 0.5 to 30 wt % of tertiary, polyisobutene amines of the formula Ia.

The mixtures of the invention can be used as such or in admixture with other predominantly primary polyisobutene amines or other secondary polyisobutene amines, provided an effective content of the secondary polyisobutene amines of the formula I is present eg at least 20 ppm in fuels or 0.5 wt % in lubricants.

By fuels we mean fuels for internal combustion engines and primarily for Otto engines. The amounts of the polyisobutene amines added to these fuels are usually from 20 to 5000 mg/kg, particularly from 50 to 100 mg/kg of fuel.

The polyisobutene amines can are present in the lubricants of the invention in amounts of, say, from 0.5 to 15 wt % and particularly from 0.5 to 10 wt % based, in each case, on the total weight.

Specifically, the synthesis technique is advantageously carried out in the presence of an unsupported rhodium catalyst capable of forming rhodium carbonyl complexes under the reaction conditions. Suitable starting compounds are eg rhodium acetate, rhodium nitrate, $Rh(CO)_2acac$, or $HRh(PPh_3)_3CO$.

The reaction can also be carried out in the presence of further additives; these are of minor significance, however, regarding the success of the reaction. Examples are: mono- or poly-dentate Group V donor ligands, particularly nitrogen and phosphorus compounds, mono- or poly-dentate Group VI donor ligands, particularly oxygen and sulfur compounds. Examples are: pyridine, picolines, 2,2-bipyridines, phosphines such as triphenylphosphine, phosphites such as tris(2,4-di-tert-butylphenyl)phosphite, tris(2,4-di-tert-butylphenyl)phosphite, aliphatic or aromatic alcohols, or ethers, carboxylic acid derivatives, and aliphatic or aromatic thiols or thioethers.

To improve handling of the polyolefins the reaction can be carried out in suitable, inert solvents. Aliphatic (open-chain or cyclic) hydrocarbons, aromatic hydrocarbons, aliphatic (open-chain or cyclic) ethers, aromatic ethers, polyethers, and tertiary alkyl or aryl amines are suitable. Also, excess ammonia can be used as solvent.

The reaction is carried out under an elevated pressure of up to 600 bar, pressures ranging from 100 to 350 bar being preferred. Suitable temperatures are from 80° to 200° C., a temperature range of from 110° to 180° C. and in particular of from 130° to 170° C. being preferred.

Suitable polyisobutenes have a molar mass of from 250 to 3000 g/mol, particularly from 500 to 1500 g/mol. They contain at least one double bond per molecule, whilst the position of the double bond is not crucial. Particularly high yields are obtained however using polyisobutenes having a terminal double bond. Since in the case of the secondary polyisobutene amines the overall molar mass, based on the polyisobutene amine used, has twice the value, in one embodiment of the invention the starting material used can be polyisobutene of a lower molar mass, eg one of from 250 to 800 g/mol.

Ammonia can be added to the reaction mixture as an aqueous solution or in pure form at the commencement of or during the reaction, the procedure involving the use of aqueous ammonia being preferred. In this case ammonia is usually used in excess eg in a stoichiometric excess of up to 100 times.

EXAMPLE 1 a) Synthesis 300 g of polyisobutene (BASF ES 3250 molar mass $M_n$ 1000 g/mol, content of terminal double bonds 85%, as determined by $^{13}C$-NMR analysis), 300 g of Mihagol M ($C_{12}$–$C_{14}$ paraffins, sold by Wintershall), 102 g of an aqueous, 25% strength $NH_3$ solution (molar ratio of $NH_3$ to polyisobutene=5), and also 0.13 g of rhodium dicarbonyl acetylacetonate, equivalent to a rhodium content of 85 ppm based on the total mixture, are weighed into an agitated autoclave. The autoclave is fitted into a shaker, purged with synthesis gas (equimolar mixture of CO and $H_2$), placed under a synthesis gas pressure of from 260 to 280 bar, and heated to 150° C. The reaction is carried out under these conditions over a period of five hours. Following cooling and pressure let-down, the aqueous phase is separated and the organic phase liberated from the solvent and ammonia residues under reduced pressure (up to 150° C./1 mbar).

Constants of the products obtained were ascertained, and the determination, by column chromatography, of the yield of functionalized product, mass-spectrometric analysis (MALDI-TOF), and an engine test on a 4-cylinder Otto engine (Opel Kadett 1200) were carried out to test the efficiency of the products in keeping inlet valves clean.

The following results were obtained:

Yield of functionalized product (by column-chromatrographic analysis): 84%

| Constants, mg KOH/g | amine number: | 18 |
|---|---|---|
|  | sec-amine number | 13 |
|  | tert-amine number | 4 |
|  | carbonyl number | 2 |
|  | alcohol number | 4 |
| molar mass (GPC, $M_n$), g/mol |  | 1955 |

Mass-spectrometric analysis (MALDI-TOF-MS) gives indubitable evidence of the presence of primary, secondary, and tertiary polyisobutene amines. On the basis of the constants these are present in a molar ratio of 1:13:4.

B) Engine test (4-cylinder Otto-engine Opel Kadett 1200)

conditions: 200 mg/kg of polyisobutene amine mixture as per (a), (100%) in Eurosuper leadless.

| | Deposits per Valve, mg | | | |
|---|---|---|---|---|
| Valve No | 1 | 2 | 3 | 4 |
| With additive | 3 | 20 | 3 | 6 |
| With no additive | 554 | 343 | 293 | 484 |

The high degree of suitability thereof for use as valve detergents is clear from an average value of 8 mg of deposits per valve as against 419 mg of deposits without the inclusion of additive under identical test conditions.

C) Comparison with a predominantly primary polyisobutene amine

Comparison of the thermal stability as opposed to that of polyisobutene amine as described in EP 0,244,616, example 1, demonstrates the improved properties of the polyisobutene amine mixture of Example 1 of the invention:

| Comparison | EP 0,244,616 Example 1 | PIB amine mixture of Example 1 above |
|---|---|---|
| Loss of weight under nitrogen at | | |
| 200° C. | 3% | 0% |
| 250° C. | 5% | 2% |
| 300° C. | 13% | 3% |
| 350° C. | 42% | 14% |
| 400° C. | 100% | 97% |
| Loss of weight in air at | | |
| 200° C. | 6% | 3% |
| 250° C. | 17% | 16% |
| 300° C. | 50% | 44% |
| 350° C. | 96% | 85% |
| 400° C. | 100% | 100% |

The higher stability is particularly apparent from the experiments carried out under nitrogen.

EXAMPLE 2

Example 1 was repeated, except that the reaction was carried out at 140° C., whilst in addition to the aqueous ammonia solution 87 g of anhydrous ammonia were fed to the autoclave via a pressure vessel (overall molar ratio $NH_3$:PIB=20). Purification was carried out as in Example 1. On the product obtained constants were ascertained and also the yield of functionalized product was determined by column chromatography.

The following results were obtained:

Yield of functionalized product by column-chromatographic analysis) 80%

| Constants, mg KOH/g | amine number | 26 |
|---|---|---|
| | primary amine number | 1 |
| | sec-amine number | 22 |
| | tert-amine number | 3 |
| | carbonyl number | 1 |
| | alcohol number | 2 |
| Molar mass (GPC, $M_n$), g/mol: | | 2022 |

The example demonstrates that the amine yield can be raised by raising the ammonia excess. However the main product is still the secondary polyisobutene amine.

We claim:

1. A fuel or lubricant composition comprising polyisobutene amines, in an amount of from 20 to 5000 mg/kg, based upon the fuel, and from 0.5 to 15% by weight, based upon the lubricant, wherein at least one of the polyisobutene amines is a secondary polyisobutene amine of the formula I

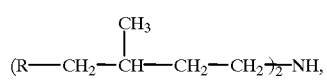

(I)

in which R denotes a polyisobutene radical of from 6 to 45 isobutylene units, where up to 20% of the isobutylene units can be replaced by n-butylene units, and wherein the amount of the secondary polyisobutene amine of the formula I is larger than the amount of any corresponding primary or tertiary polyisobutene amine present in the composition.

2. The fuel composition defined in claim 1, comprising at least 20 ppm of the secondary polyisobutene amine of the formula I.

3. The lubricant composition defined in claim 1, comprising at least 0.5 wt %, based on the lubricant, of the secondary polyisobutene amine of the formula I.

4. The fuel or lubricant composition defined in claim 1, comprising at least 50 wt %, based on the total content of primary, secondary, and tertiary polyisobutene amines, of the secondary polyisobutene amine of the formula I.

5. The fuel or lubricant composition defined in claim 1, wherein the polyisobutene radical R is of from 8 to 35 isobutylene units.

6. A process for the preparation of a mixture of polyisobutene amines of the formula Ia

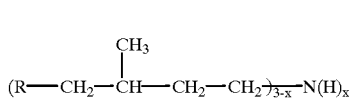

(Ia)

in which R denotes a polyisobutene radical of from 6 to 45 isobutylene units, where up to 20% of the isobutylene units can be replaced by n-butylene units, and x is 1, 2 or 3. which predominantly consists of secondary polyisobutene amines of the formula I

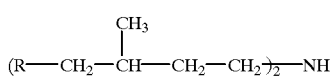

(I)

wherein R is as defined above, which process comprises in the same step hydroformylating and aminating a polyisobutene exhibiting predominantly terminal double bonds and having the formula II

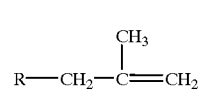

(II)

with CO and $H_2$ in the presence of at least the equivalent amount of ammonia and an unsupported rhodium catalyst capable of forming rhodium carbonyl complexes under the reaction conditions, at a temperature in the range of from 80° C. to 200° C. and a pressure of up to 600 bar.

7. The process defined in claim 6, wherein the ammonia is at least partly in the form of aqueous ammonia.

8. The process defined in claim 6, wherein the rhodium catalyst is rhodium acetate, rhodium nitrate, rhodium dicarbonyl acetylacetonate, or triphenylphosphine rhodium carbonyl hydrogen, or a mixture of the said rhodium compounds with tertiary phosphines or phosphites.

9. A method of making a fuel or lubricant composition as defined in claim 1, which comprises adding an amount effective as an additive of a mixture containing predominantly secondary polyisobutene amines to a fuel or lubricant.

10. A polyisobutene amine mixture of primary, secondary, and tertiary polyisobutene amines of the formula Ia

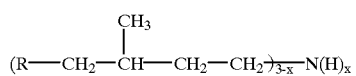

in which R denotes a polyisobutene radical of from 6 to 45 isobutylene units, where up to 20% of the isobutylene units can be replaced by n-butylene units, and x is 1, 2 or 3, which predominantly consists of secondary polyisobutene amines of the formula I

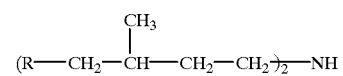

wherein R is as defined above.

* * * * *